United States Patent [19]
Rayces

[11] 4,056,307
[45] Nov. 1, 1977

[54] ANAMORPHIC SCANNER LENS SYSTEM

[75] Inventor: Juan L. Rayces, Santa Ana, Calif.

[73] Assignee: The Perkin-Elmer Corporation, Norwalk, Conn.

[21] Appl. No.: 737,140

[22] Filed: Oct. 29, 1976

[51] Int. Cl.² .......................... G02B 13/08; G02B 3/06
[52] U.S. Cl. ..................................... 350/181; 350/176; 350/190; 350/206
[58] Field of Search ............... 350/176, 181, 190, 206, 350/22, 23, 24, 26

[56] References Cited
U.S. PATENT DOCUMENTS

| | | | |
|---|---|---|---|
| 2,719,457 | 10/1955 | Tripp | 350/24 |
| 2,720,813 | 10/1955 | Cox | 350/181 |

Primary Examiner—Paul A. Sacher
Attorney, Agent, or Firm—S. A. Giarratana; F. L. Masselle

[57] ABSTRACT

An improved anamorphic scanner lens system including seven axially aligned cylindrical lens elements, the cylinder axes of the surfaces of the first six elements being disposed at right angles to the direction of the scan line, the axis of the front surfaces of the last element being parallel to the scan line and the rear surface thereof being substantially flat, the first six cylinders being arranged in pairs with each pair consisting of a biconvex positive lens and a negative meniscus lens, the concave side of the menisci alternate pointing toward the direction of the light; and an aperture stop disposed in front of the first lens.

8 Claims, 1 Drawing Figure

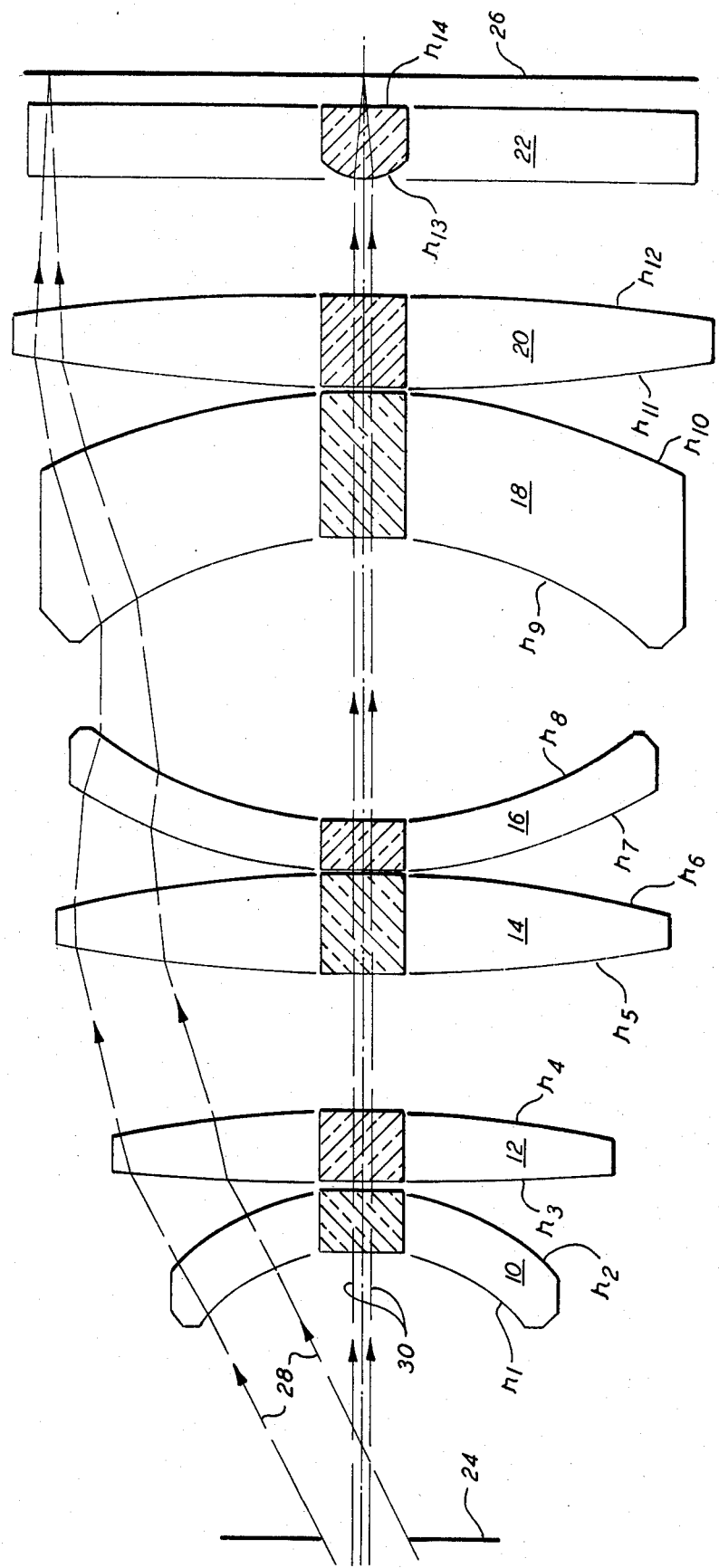

ANAMORPHIC SCANNER LENS SYSTEM

BACKGROUND OF THE INVENTION

This invention relates to optical systems. More particularly, the invention concerns a scanner lens system to focus collimated monochromatic light reflected by a spinning mirror onto a luminous point, which generates a straight line, and the displacement of he point along the straight line, measured from the optical axis, is a linear function of the angle of rotation of the mirror.

While different types of scanner lens systems for said purpose have been employed heretofore with reasonable success, my contribution to the art is a new scanner lens system that is an improvement over such prior art systems, as will become apparent as the description proceeds. Particular difficulties were experienced in such prior art systems due to the tendency of the mirror to wobble, which resulted in irregulatities in the line so generated.

SUMMARY OF THE INVENTION

It is a primary general object of the invention to overcome or at least mitigate the problems and shortcomings of the systems according to the prior art.

A more specific object of the invention is to provide an arrangement and combination of cylindrical lens elements that has a high degree of correction in the wavefronts converging to form a point image, and a negligible error of linearity.

A further object of the invention is the provision of an anamorphic lens system having an anamorphic ratio which reduces the irregularity of the line resulting from a wobbling mirror.

To the accomplishment of the foregoing and other objectives, the invention contemplates the provision of a new and improved anamorphic scanner lens system which includes in axial alignment, preferably three, pairs of cylindrical lens elements with the cylinder axes of the surfaces being at right angles to the direction of the scan line. Each pair of lens elements consists of a biconvex lens and a negative meniscus lens, the concave side of the menisci alternate pointing toward the direction of the light and in the direction of the light. Further, another cylindrical lens element is disposed behind the aforesaid pairs of lenses, which has a front surface having an axis parallel to the scan line and a substantially flat rear surface. The system also includes an aperture stop disposed is spaced relationship in front of the first lens elements. Preferably this aperture stop is of rectangular configuration, and the dimensions thereof with respect to the anamorphic ratio are so selected that the exit pupil of the system is square in shape.

Preferably, the index of refraction of all of the lens elements is substantially the same, and the material of all of the lenses have substantially the same dispersive power.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which the disclosure is based may readily be utilized as a basis for the designing of other systems for carrying out the several purposes of the invention. It is important, therefore, that the claims be regarded as including such equivalent systems as do not depart from the spirit and scope of the invention.

A specific embodiment of the invention has been chosen for purposes of illustration and description, and is shown in the accompanying drawings, forming a part of the specification.

BRIEF DESCRIPTION OF THE DRAWINGS

The drawing is an optical diagram of one embodiment of the invention.

DETAILED DESCRIPTION OF THE PREFERRED EMBODIMENT

In the preferred embodiment, the anamorphic lens system comprises seven cylindrical lens elements 10, 12, 14, 16, 18, 20 and 22. The cylindrical axes of the surfaces of the first six elements 10 to 20 inclusive, are all parallel to the spin axis of a mirror (not shown). That is, the cylinder axes of the surfaces of the first six elements are disposed at right angles to the direction of the scan line. The axis of the front surface of the last element 22 is parallel to the scan line, and the second or rear surface of the last element is flat. Through out this description the direction toward the incoming light will be referred to as the front.

The first six cylinders are arranged in pairs 10 and 12, 14 and 16, 18 and 20. The first pair includes the first lens 10, which is a negative meniscus lens having a first concave surface of radius $r_1$ and a second concave surface $r_2$, both of which point toward the front, or toward the direction of the light. The second lens is a biconvex positive lens having a first surface of radius $r_3$ and a second surface of radius $r_4$. The second pair of lenses include the third lens 14 which is a biconvex positive lens having a first surface of radius $r_5$ and a second surface of radius $r_6$. The second pair of lenses also includes the fourth lens 16 which is a negative meniscus lens having a first concave surface of radius $r_7$ and a second concave surface of radius $r_8$, both of which point toward the rear. The third pair of lenses includes the fifth lens 18 which is a negative meniscus lens having a first concave surface of radius $r_9$ and a second concave surface of radius $r_{10}$, both of which point toward the front, or toward the direction of the light. The third pair of lenses also includes the sixth lens 20 which is a biconvex positive lens having a first surface of radius $r_{11}$ and a second surface of radius $r_{12}$. It will thus be seen that each pair of lenses consists of a biconvex positive lens and a negative meniscus lens arranged so that the concave side of the menisci alternate pointing toward the front and toward the rear. As indicated hereinbefore the last lens element 22 has a front surface with an axis parralel to the scan line and a radius $r_{13}$. The rear surface of this element is flat and, hence, has a radius $r_{14}$ of infinity.

It will be appreciated that the lens elements may be fabricated from any suitable type of lens material, preferably high refractive index glass. However, more preferably for convenience purposes, all of the lens elements are made from the same type of optical glass, viz., dense flint SF-6 in the Schott classification. With high refractive index material it is possible to achieve a high degree of efficiency in the reduction of Fresnel surface reflections with the use of a single layer of magnesium fluoride.

Still referring to the drawing, an aperture stop 24 is provided in front of the first lens element 10. This aperture stop is rectangular in shape, and the dimensions thereof are so selected with respect to the anamorphic ratio, that the exit pupil of the system is square in shape. The principal or chief rays fall perpendicularly on an image surface, as indicated at 26 in the drawing. It will be appreciated that there are definite advantages to the use of a rectangular aperture stop with its square exit pupil as compared to an elliptical aperture with a circular pupil. The rectangular shape conforms better to the shape of the spinning mirror element, and also for a given f/number the square aperture gives considerably better resolution in the middle and lower frequencies than the circular aperture. For example, with an f/8 system working with a wavelength of light of 5145 Angstroms the square aperture gives about 59% modulation transfer at 110 lines per millimeter whereas the circular aperture gives only about 45% at the same spatial frequency, assuming in both cases that a diffraction limited system is employed.

Rays of light in the direction of scan are indicated at 28 in the drawing, and rays of light in the normal to the direction of scan are indicated at 30.

As an example of an anamorphic scanner lens system according to the invention, the scanner lens may be designed to work with a wavelength of light of 5145 Angstroms. The length of the line is 9 inches, corresponding to a rotation angle of 54° in the input of parallel light. The relative aperture is f/8 in the direction of the scan and also in the normal to the direction of scan. An anamorphic ratio of 10 to 1 is provided by the crossed cylindrical lenses. The aperture stop is located four inches ahead of the first lens element, and it is rectangular in shape, 1.2 inches long in the direction of scan and 0.12 inches wide. Because of the 10 to 1 anamorphic ratio the exit pupil of the system is square in shape.

In Table 1 below, the values for the lenses of the drawing are listed. As is well known in the art, a plus sign is used to denote that a surface is convex to the direction toward the incoming light and that a distance is measured from left to right whereas a minus sign is used to denote that a surface is concave to the direction toward the incoming light and that a distance is measured from right to left.

TABLE I

Focal length - 9.5 in.
Relative aperature - f/8 (Square aperture)
Angle of scanning - 54°
Overall length - 16.114 in.
Front vertex distance - 16.52
Stop position - 4.0273 in. ahead of first element

| Element | | Radius | Thickness | Refractive Index | Abbe V No. | Axial Distance |
|---|---|---|---|---|---|---|
| 10 | $r_1$ | −3.1675 | .8459 | 1.805 | .254 | 0.000 |
|  | $r_2$ | −3.8737 | .1511 |  |  | .845 |
| 12 | $r_3$ | 50.7119 | 1.0000 | 1.805 | .254 | .997 |
|  | $r_4$ | −17.7078 | 1.9480 |  |  | 1.997 |
| 14 | $r_5$ | 25.7653 | 1.4000 | 1.805 | .254 | 3.945 |
|  | $r_6$ | −18.1197 | .0515 |  |  | 5.345 |
| 16 | $r_7$ | 8.0063 | .6955 | 1.805 | .254 | 5.396 |
|  | $r_8$ | 6.6508 | 3.9720 |  |  | 6.092 |
| 18 | $r_9$ | −6.3665 | 2.0931 | 1.805 | .254 | 10.064 |
|  | $r_{10}$ | −9.8819 | .0370 |  |  | 12.157 |
| 20 | $r_{11}$ | 33.4483 | 1.2500 | 1.805 | .254 | 12.194 |
|  | $r_{12}$ | −39.4346 | 1.6699 |  |  | 13.444 |
| 22 | $r_{13}$ | .7829 | 1.0000 | 1.805 | .254 | 15.114 |
|  | $r_{14}$ | 99999.9999 | .4041 |  |  | 16.114 |
| 26 | Image Surface |  |  |  |  | 16.518 |

In order to more fully appreciate the benefits of the anamorphic scanner lens system having the characteristics set forth in Table 1, Tables 2 to 6 indicate the optical transfer function and percent error for five spaced field points located along the scan line, corresponding to various inlet angles of the beam.

TABLE 2

OPTICAL TRANFER FUNCTION OF THE LENS SYSTEM OF TABLE 1

Field point No. 1
Length H (on Y axis) - 0.00 in.
Angle of beam $\theta$ - 0.00°
f(focal length) $\theta$ (radians) - 0.00
Error - 0.00%

| | Optical Transfer Function | |
|---|---|---|
| Frequency | Tangential Line | Radial Line |
| 0.0 | 100.00 | 100.00 |
| 10.0 | 95.52 | 95.80 |
| 20.0 | 90.80 | 91.51 |
| 30.0 | 86.11 | 87.16 |
| 40.0 | 81.54 | 82.81 |
| 50.0 | 77.10 | 78.46 |
| 60.0 | 72.76 | 74.15 |
| 70.0 | 68.51 | 69.88 |
| 80.0 | 64.38 | 65.66 |
| 90.0 | 60.38 | 61.50 |
| 100.0 | 56.48 | 57.39 |
| 110.0 | 52.66 | 53.33 |
| 120.0 | 48.87 | 49.32 |
| 130.0 | 45.06 | 45.33 |
| 140.0 | 41.19 | 41.36 |
| 150.0 | 37.23 | 37.40 |
| 160.0 | 33.18 | 33.44 |
| 170.0 | 29.06 | 29.48 |
| 180.0 | 24.92 | 25.49 |
| 190.0 | 20.82 | 21.49 |
| 200.0 | 16.82 | 17.48 |

TABLE 3

OPTICAL TRANSFER FUNCTION OF THE LENS SYSTEM OF TABLE 1

Field point No. 2
Length H (on Y axis) - 2.249171 in.
Angle of beam $\theta$ - 13.50°
f(focal length) $\theta$ (radians) - 2.250
Error - 0.04%

| | Optical Transfer Function | |
|---|---|---|
| Frequency | Tangential Line | Radial Line |
| 0.0 | 100.00 | 100.00 |
| 10.0 | 95.08 | 95.80 |
| 20.0 | 89.37 | 91.50 |
| 30.0 | 83.33 | 87.16 |
| 40.0 | 77.31 | 82.80 |
| 50.0 | 71.56 | 78.45 |
| 60.0 | 66.20 | 74.13 |
| 70.0 | 61.30 | 69.85 |
| 80.0 | 56.83 | 65.63 |
| 90.0 | 52.74 | 61.47 |
| 100.0 | 48.99 | 57.36 |

TABLE 3-continued
OPTICAL TRANSFER FUNCTION OF THE LENS SYSTEM OF TABLE 1
Field point No. 2
Length H (on Y axis) - 2.249171 in.
Angle of beam $\theta$ - 13.50°
f(focal length) $\theta$ (radians) - 2.250
Error - 0.04%

| Frequency | Optical Transfer Function | |
|---|---|---|
| | Tangential Line | Radial Line |
| 110.0 | 45.49 | 53.30 |
| 120.0 | 42.20 | 49.29 |
| 130.0 | 39.03 | 45.31 |
| 140.0 | 35.87 | 41.35 |
| 150.0 | 32.70 | 37.39 |
| 160.0 | 29.45 | 33.44 |
| 170.0 | 26.07 | 29.48 |
| 180.0 | 22.55 | 25.49 |
| 190.0 | 18.85 | 21.50 |
| 200.0 | 14.96 | 17.48 |

TABLE 4
OPTICAL TRANSFER FUNCTION OF THE LENS SYSTEM FOR TABLE 1
Field point No. 3
Length H (on Y axis) - 3.180648 in.
Angle of beam $\theta$ (radians) - 19.09°
f(focal length) $\theta$ - 3.181669
Error - 0.03%

| Frequency | Optical Transfer Function | |
|---|---|---|
| | Tangential Line | Radial Line |
| 0.0 | 100.00 | 100.00 |
| 10.0 | 95.56 | 95.81 |
| 20.0 | 91.01 | 91.54 |
| 30.0 | 86.42 | 87.23 |
| 40.0 | 81.82 | 82.90 |
| 50.0 | 77.24 | 78.58 |
| 60.0 | 72.69 | 74.28 |
| 70.0 | 68.19 | 70.02 |
| 80.0 | 63.76 | 65.81 |
| 90.0 | 59.39 | 61.65 |
| 100.0 | 55.09 | 57.55 |
| 110.0 | 50.84 | 53.49 |
| 120.0 | 46.63 | 49.47 |
| 130.0 | 42.43 | 45.48 |
| 140.0 | 38.24 | 41.51 |
| 150.0 | 34.03 | 37.54 |
| 160.0 | 29.80 | 33.56 |
| 170.0 | 25.56 | 29.58 |
| 180.0 | 21.30 | 25.57 |
| 190.0 | 17.03 | 21.55 |
| 200.0 | 12.75 | 17.52 |

TABLE 5
OPTICAL TRANSFER FUNCTION OF THE LENS SYSTEM OF TABLE 1
Field point No. 4
Length H (on Y axis) - 3.895739 in.
Angle of beam $\theta$ (radians) - 23.38°
f(focal length) $\theta$ - 3.896674
Error - 0.02%

| Frequency | Optical Transfer Function | |
|---|---|---|
| | Tangential Line | Radial Line |
| 0.0 | 100.00 | 100.00 |
| 10.0 | 95.04 | 95.82 |
| 20.0 | 89.45 | 91.57 |
| 30.0 | 83.53 | 87.28 |
| 40.0 | 77.57 | 82.97 |
| 50.0 | 71.78 | 78.66 |
| 60.0 | 66.32 | 74.38 |
| 70.0 | 61.29 | 70.13 |
| 80.0 | 56.73 | 65.93 |
| 90.0 | 52.60 | 61.77 |
| 100.0 | 48.84 | 57.67 |
| 110.0 | 45.32 | 53.61 |
| 120.0 | 41.92 | 49.59 |
| 130.0 | 38.52 | 45.59 |
| 140.0 | 35.02 | 41.61 |
| 150.0 | 31.34 | 37.63 |
| 160.0 | 27.44 | 33.65 |
| 170.0 | 23.34 | 29.65 |
| 180.0 | 19.08 | 25.63 |
| 190.0 | 14.70 | 21.60 |
| 200.0 | 10.26 | 17.55 |

TABLE 6
OPTICAL TRANSFER FUNCTION OF THE LENS SYSTEM OF TABLE 1
Field point No. 5
Length H (on Y axis) - 4.500046 in.
Angle of beam $\theta$ - 27.00°
f(focal length) $\theta$ (radians) - 4.500
Error - 0.00%

| Frequency | Optical Transfer Function | |
|---|---|---|
| | Tangential Line | Radial Line |
| 0.0 | 100.0 | 100.0 |
| 10.0 | 95.32 | 95.82 |
| 20.0 | 90.57 | 91.55 |
| 30.0 | 85.79 | 87.24 |
| 40.0 | 81.00 | 82.92 |
| 50.0 | 76.22 | 78.59 |
| 60.0 | 71.47 | 74.29 |
| 70.0 | 66.76 | 70.03 |
| 80.0 | 62.09 | 65.82 |
| 90.0 | 57.45 | 61.66 |
| 100.0 | 52.86 | 57.55 |
| 110.0 | 48.29 | 53.50 |
| 120.0 | 43.76 | 49.49 |
| 130.0 | 39.24 | 45.50 |
| 140.0 | 34.73 | 41.53 |
| 150.0 | 30.22 | 37.57 |
| 160.0 | 25.72 | 33.60 |
| 170.0 | 21.21 | 29.61 |
| 180.0 | 16.69 | 25.61 |
| 190.0 | 12.16 | 21.58 |
| 200.0 | 7.61 | 17.54 |

Having thus described the invention with particular reference to the preferred form thereof, it will be obvious to those skilled in the art to which the invention pertains, after understanding the invention that various changes and modifications may be made therein without departing from the spirit and scope of the invention, as defined by the claims appended hereto.

What is claimed is:

1. An anamorphic scanner lens system comprising in axial alignment:
   a plurality of pairs of cylindrical lens elements, the cylinder axes of the surfaces thereof being at right angles to the direction of the scan line, each pair consisting of a biconvex positive lens and a negative meniscus lens, the concave side of the menisci alternate pointing toward the direction of the light and in the direction of the light;
   aperture stop means disposed in front of said plurality of pairs of lens elements; and
   a cylindrical lens element disposed behind said plurality of pairs of lens elements having a front surface having an axis parallel to the scan line and having a substantially flat rear surface.

2. An anamorphic scanner lens system according to claim 1 wherein said plurality of pairs of cylindrical lens elements is three.

3. An anamorphic scanner lens system according to claim 2 wherein said aperture stop means is of rectangular configuration.

4. An anamorphic scanner lens system according to claim 3 wherein the dimensions of said aperture stop means with respect to the anamorphic ratio are so selected that the exit pupil of the system is square in shape.

5. An anamorphic scanner lens system according to claim 2 wherein the index of refraction of all of said lens elements is substantially the same.

6. An anamorphic scanner lens system according to claim 2 wherein the material of all of said lens elements have substantially the same dispersive power.

7. An anamorphic scanner lens system comprising in axial alignment:

three pairs of cylindrical lens elements, the cylinder axes of the surfaces thereof being at right angles to the direction of the scan line, each pair consisting of a biconvex positive lens and a negative meniscus lens, the concave side of the menisci alternate pointing toward the direction of the light and in the direction of the light;

aperture stop means disposed in front of said three pairs of lens elements;

a cylindrical lens element disposed behind said three pairs of lens elements having a front surface having an axis parallel to the scan line and having a substantially flat rear surface; and said system being characterized by the following constructional data:

Focal length - 9.5 in.
Relative aperature - f/8 (Square aperture)
Angle of scanning - 54°
Overall length - 16.114 in.
Front vertex distance - 16.52
Stop position - 4.0273 in. ahead of first element

| Element | | Radius | Thickness | Refractive Index | Abbe V No. | Axial Distance |
|---|---|---|---|---|---|---|
| 10 | $r_1$ | −3.1675 | .8459 | 1.805 | .254 | 0.000 |
|  | $r_2$ | −3.8737 | .1511 |  |  | .845 |
| 12 | $r_3$ | 50.7119 | 1.0000 | 1.805 | .254 | .997 |
|  | $r_4$ | −17.7078 | 1.9480 |  |  | 1.997 |
| 14 | $r_5$ | 25.7653 | 1.4000 | 1.805 | .254 | 3.945 |
|  | $r_6$ | −18.1197 | .0515 |  |  | 5.345 |
| 16 | $r_7$ | 8.0063 | .6955 | 1.805 | .254 | 5.396 |
|  | $r_8$ | 6.6508 | 3.9720 |  |  | 6.092 |
| 18 | $r_9$ | −6.3665 | 2.0931 | 1.805 | .254 | 10.064 |
|  | $r_{10}$ | −9.8819 | .0370 |  |  | 12.157 |
| 20 | $r_{11}$ | 33.4483 | 1.2500 | 1.805 | .254 | 12.194 |
|  | $r_{12}$ | −39.4346 | 1.6699 |  |  | 13.444 |
| 22 | $r_{13}$ | .7829 | 1.0000 | 1.805 | .254 | 15.114 |
|  | $r_{14}$ | 99999.9999 | .4041 |  |  | 16.114 |
| 26 | Image Surface |  |  |  |  | 16.518 |

8. An anamorphic scanner lens system according to claim 7 wherein said aperture stop means is of rectangular shape having a length of about 1.2 inches in the direction of scan and a width of about 0.12 inches.

* * * * *

UNITED STATES PATENT AND TRADEMARK OFFICE
CERTIFICATE OF CORRECTION

PATENT NO. : 4,056,307

DATED : November 1, 1977

INVENTOR(S) : Juan L. Rayces

It is certified that error appears in the above-identified patent and that said Letters Patent are hereby corrected as shown below:

Column 1, line 9, change "he" to --the--.

Column 1, line 38, before"preferably", insert --a plurality,--

Column 2, line 18, change "cylindrical axes" to --cylinder axes--

Signed and Sealed this

Fourth Day of July 1978

[SEAL]

Attest:

RUTH C. MASON
Attesting Officer

DONALD W. BANNER
Commissioner of Patents and Trademarks